United States Patent
Baca et al.

(10) Patent No.: US 10,452,134 B2
(45) Date of Patent: Oct. 22, 2019

(54) AUTOMATED PERIPHERAL DEVICE HANDOFF BASED ON EYE TRACKING

(71) Applicants: Jim S. Baca, Corrales, NM (US); Sankar Eswarasubramanian, Dallas, TX (US)

(72) Inventors: Jim S. Baca, Corrales, NM (US); Sankar Eswarasubramanian, Dallas, TX (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 14/750,705

(22) Filed: Jun. 25, 2015

(65) Prior Publication Data

US 2016/0378179 A1 Dec. 29, 2016

(51) Int. Cl.
- *G09G 5/00* (2006.01)
- *G06F 3/01* (2006.01)
- *G06F 3/038* (2013.01)

(52) U.S. Cl.
CPC .............. *G06F 3/013* (2013.01); *G06F 3/038* (2013.01)

(58) Field of Classification Search
CPC ...... G06F 3/013; G06F 3/0304; G06F 3/0481; G06F 3/0484; G06F 3/038; H04L 67/06
USPC .......................................................... 345/156
See application file for complete search history.

(56) References Cited

U.S. PATENT DOCUMENTS

| | | | | |
|---|---|---|---|---|
| 2012/0272179 A1* | 10/2012 | Stafford | .................. | G06F 3/012 715/781 |
| 2014/0375586 A1* | 12/2014 | de Leon | .................. | G06F 3/013 345/173 |
| 2015/0331485 A1* | 11/2015 | Wilairat | ............. | G02B 27/0172 345/156 |
| 2016/0034029 A1* | 2/2016 | Lyons | .................... | G06F 3/013 715/748 |

* cited by examiner

*Primary Examiner* — Insa Sadio
(74) *Attorney, Agent, or Firm* — Jordan IP Law, LLC

(57) ABSTRACT

Systems, apparatuses and methods may provide for identifying a plurality of computing systems proximate to a peripheral device and determining a gaze location of a user. Additionally, the peripheral device may be automatically connected to a first computing system in the plurality of computing systems based on the gaze location of the user. In one example, a change in the gaze location may be detected, wherein the peripheral device is automatically connected to a second computing system in the plurality of computing systems based on the change in the gaze location.

18 Claims, 4 Drawing Sheets

AUTOMATED PERIPHERAL DEVICE HANDOFF BASED ON EYE TRACKING

TECHNICAL FIELD

Embodiments generally relate to peripheral devices. More particularly, embodiments relate to automated peripheral device handoff based on eye tracking.

BACKGROUND

Peripheral input devices such as keyboards and mice may be used to enter information into a wide variety of computing systems such as desktop computers, notebook computers and tablet computers. When a user is simultaneously working with more than one computing system, each device may be connected to a separate set of peripheral input devices by a wired or wireless link. Such an approach may increase cost and physical space requirements due to the added expense of an extra set of peripheral input devices. Additionally, multiple sets of peripheral input devices may confuse the user as to which peripheral input device is connected to which computing system. Using a single set of peripheral input devices, on the other hand, may involve manually reconnecting the peripheral input devices when switching between computing systems. Such an approach may be time consuming and lead to a poor user experience.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
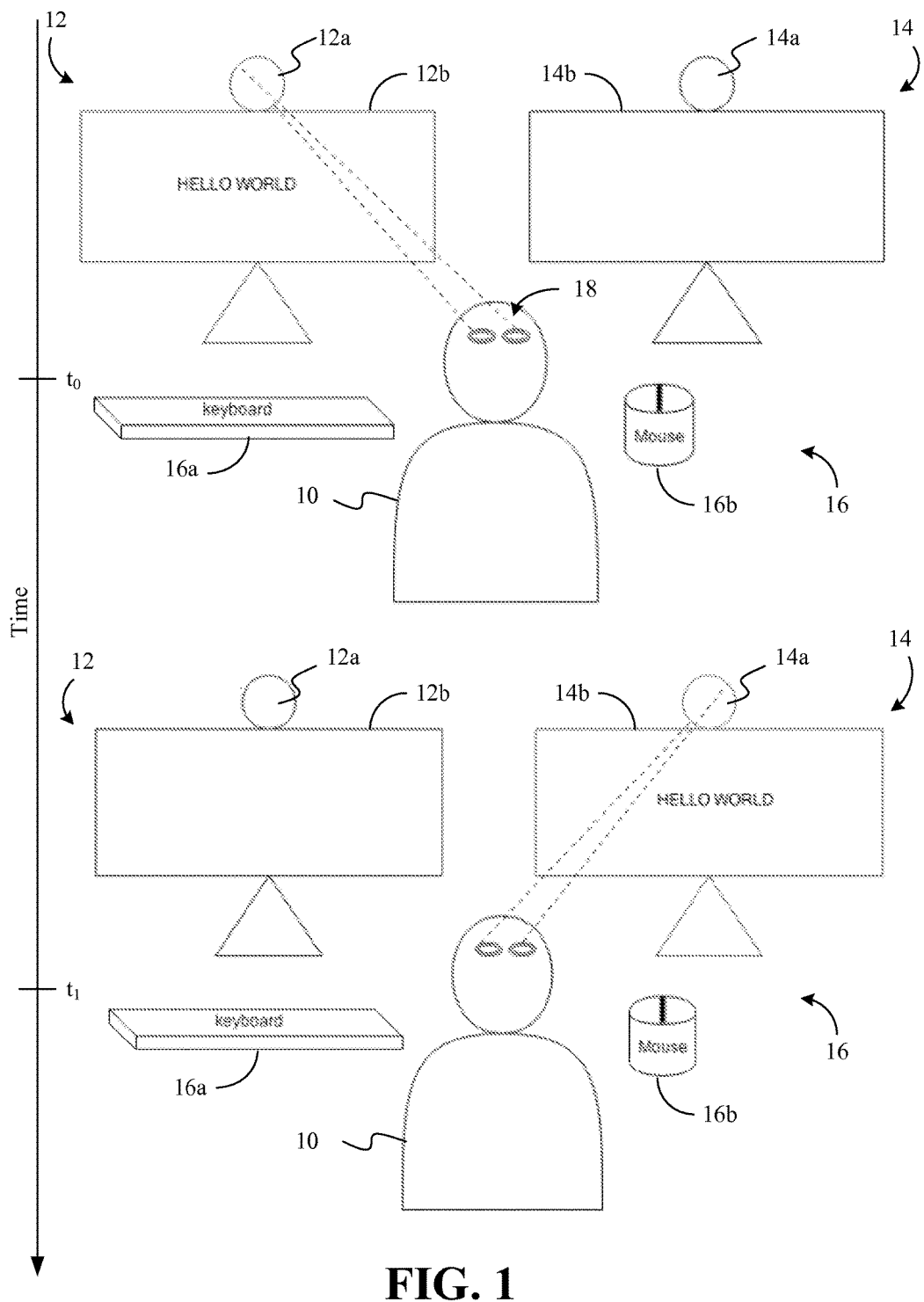
FIG. 1 is an illustration of an example of an automated peripheral device handoff according to an example.

Turning now to FIG. 1, a usage scenario is shown in which a user 10 simultaneously/concurrently interacts with a first computing system 12 (12a, 12b) and a second computing system 14 (14a, 14b) via a single set of peripheral devices 16 (16a, 16b). The single set of peripheral devices 16 may include, for example, a single keyboard 16a, a single mouse 16b, and so forth. In the illustrated example, at time to the eyes 18 (e.g., pupils) of the user 10 are looking towards the first computing system 12 so that a gaze location of the user 10 is generally on the first computing system 12. A first camera 12a physically coupled to the first computing system 12 may generate a real-time video feed that enables the gaze location of the user 10 to be determined. As a result, the peripheral devices 16 may be automatically connected to the first computing system 12 at time to so that information (e.g., "HELLO WORLD") entered via the peripheral devices 16 is presented on a first display 12b of the first computing system 12. The connection between the peripheral devices 16 and the first computing system 12 may be a wireless connection such as, for example, a Bluetooth (e.g., Institute of Electrical and Electronics Engineers/IEEE 802.15.1-2005, Wireless Personal Area Networks), Wi-Fi (Wireless Fidelity, e.g., Institute of Electrical and Electronics Engineers/IEEE 802.11-2007, Wireless Local Area Network/LAN Medium Access Control (MAC) and Physical Layer (PHY) Specifications), or other wireless connection.

At illustrated time $t_1$, on the other hand, the eyes 18 of the user 10 are looking towards the second computing system 14 so that the gaze location of the user 10 is generally on the second computing system 14. A second camera 14a physically coupled to the second computing system 14 may also generate a real-time video feed that enables the gaze location of the user 10 to be determined. As a result, the peripheral devices 16 may be automatically connected to the second computing system 14 at time $t_1$ so that information entered via the peripheral devices 16 is presented on a second display 14b of the second computing system 14. The handoff between the first computing system 12 and the second computing system 14 may take into consideration the last known cursor state of the system to which the peripheral devices 16 are being connected. The illustrated solution therefore reduces cost, physical space requirements and user confusion by enabling the single keyboard 16a and/or the single mouse 16b to be used with the multiple computing systems 12, 14. Moreover, the illustrated solution may obviate any need for manually establishing wired or wireless connections each time the user 10 switches between the computing systems 12, 14.

Figure 2:
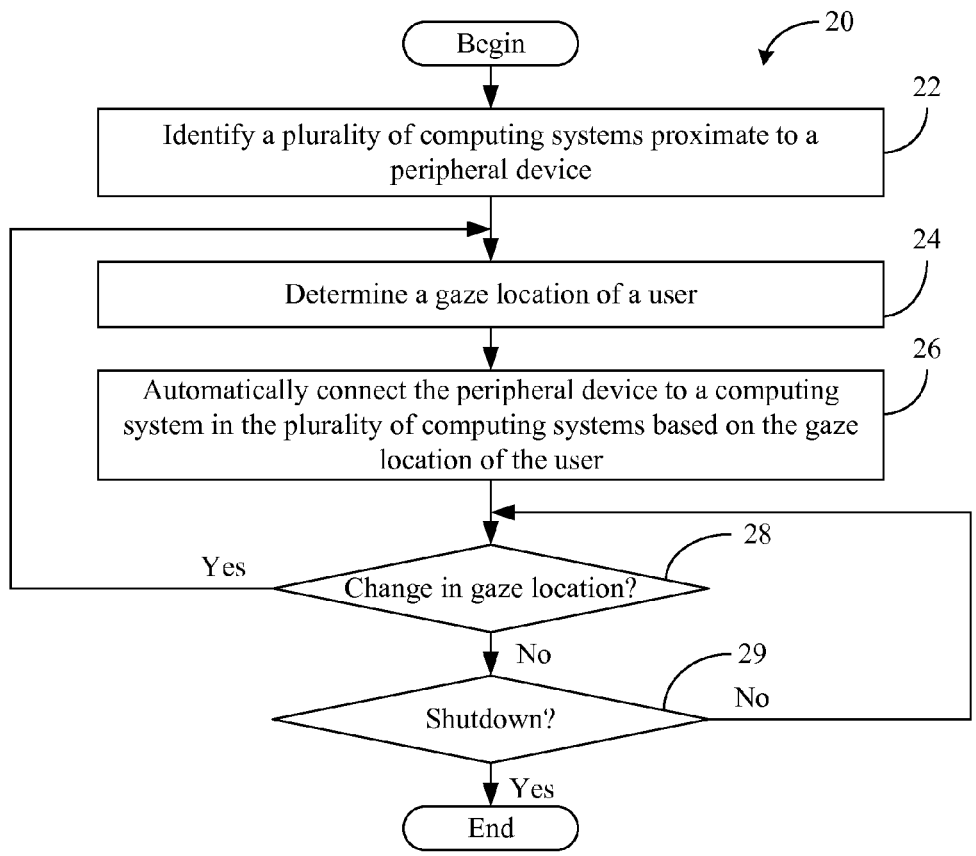
FIG. 2 is a flowchart of an example of a method of operating a connection management apparatus according to an embodiment.

FIG. 2 shows a method 20 of operating a connection management apparatus. The method 20 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 20 may be written in any combination of one or more programming languages, including an object oriented programming language such as JAVA, SMALLTALK, C++ or the like and conventional procedural programming languages, such as the "C" programming language or similar programming languages.

Illustrated processing block 22 provides for identifying a plurality of computing systems proximate/nearby to a peripheral device (e.g., keyboard, touch pad and/or mouse). Block 22 may involve pairing/registering the peripheral device with one or more of the computing systems. The computing systems may include, for example, a kiosk, desktop computer, notebook computer, tablet computer, smart phone, mobile Internet device (MID), Internet of Things (IoT) device/sensor, workstation, wearable computer, etc., or any combination thereof. Additionally, a gaze location of a user may be determined at block 24. The gaze location may be determined based on one or more real-time video feeds from cameras coupled to the computing systems. In one example, the video feeds contain depth information (e.g., depth map information) that may be used to detect the presence of the user. For example, block 24 might use the depth information to calculate the distance between the user and the cameras, wherein eye tracking analysis may be conducted once false positives have been eliminated.

Block 24 may also include determining a camera identifier associated with the gaze location and detecting a relationship between the computing system and the camera identifier, wherein the relationship is a physical coupling between the computing system and a camera corresponding to the camera identifier. For example, a relationship table such as Table I below may be maintained.

TABLE I

| Entry | Camera Identifier | Computing System Identifier |
| --- | --- | --- |
| 1 | WebCam | Company_Notebook |
| 2 | TabletCam | My_Tablet |
| n | Identifier$_{cn}$ | Identifier$_{sn}$ |

Thus, analysis of the real-time video feeds might indicate that the current gaze location is towards a particular camera having a certain identifier (e.g., "WebCam"). In such a case, block 24 may determine from the relationship table that the "WebCam" camera is physically coupled and/or co-located with the "Company Notebook" computing system. Illustrated block 26 automatically connects the peripheral device to a computing system (e.g., the "Company Notebook" computing system) in the plurality of computing systems based on the gaze location. As already noted, the automatic connection may be a wireless connection such as, for example, a Bluetooth or Wi-Fi connection. If a change in the gaze location is detected at block 28, the illustrated method 20 determines the new gaze location and automatically connects the peripheral device to a computing system associated with the new gaze location.

For example, if the real-time video feeds indicate that the current gaze location is towards another camera having a certain identifier (e.g., "TabletCam"), block 24 may be repeated to determine from the relationship table that the "TabletCam" camera is physically coupled and/or co-located with the "My Tablet" computing system. Block 26 may then be repeated in order to automatically connect (e.g., handoff) the peripheral device to the other computing system (e.g., the "My Tablet" computing system) based on the gaze location. The new connection, which may take into consideration the last known cursor state, may be over the same or a different type of wireless link. For example, the handoff may involve adjusting Bluetooth radio settings to disconnect a Bluetooth connection between the peripheral device and the previous computing system, and adjusting Wi-Fi radio settings to establish a Wi-Fi connection between the peripheral device and the current computing system. Illustrated block 29 provides for determining whether a shutdown condition has been detected. If so, the method 20 may terminate. Otherwise, the determination at block 28 may be repeated.

Figure 3:
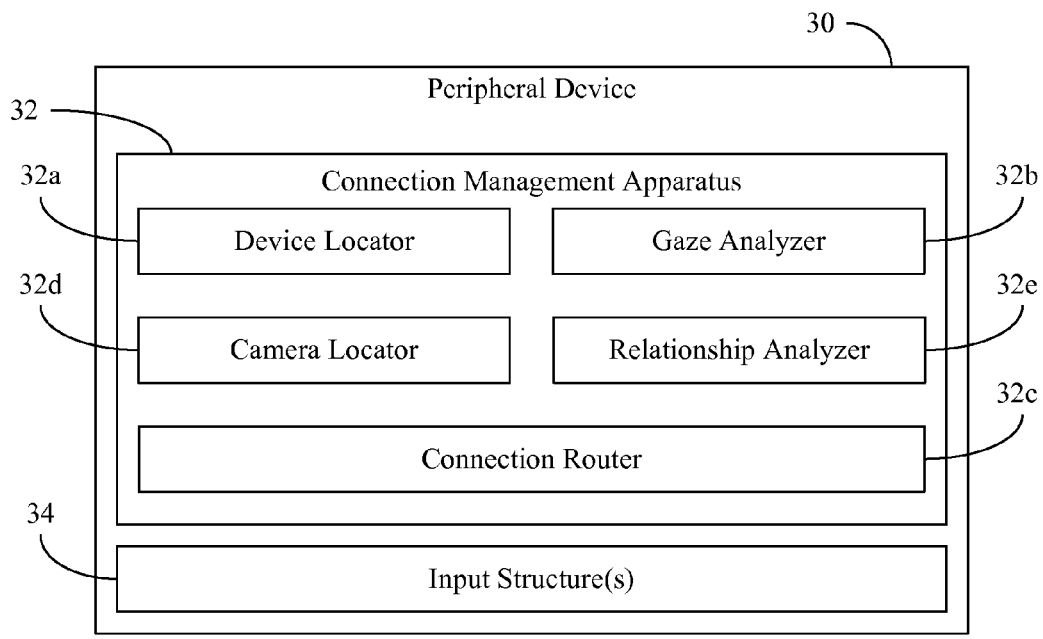
FIG. 3 is a block diagram of an example of a peripheral device having a connection management apparatus according to an embodiment.

FIG. 3 shows a peripheral device 30 (e.g., keyboard, touch pad and/or mouse) having a connection management apparatus 32 (32a-32e). The peripheral device 30 may implement one or more aspects of the method 20 (FIG. 2), and may be readily substituted for the keyboard 16a (FIG. 1) and/or mouse 16b (FIG. 1), already discussed. Thus, the peripheral device 30 may also include one or more input structures 34 that enable the entry of information into computing systems (not shown). The input structures 34 may therefore include keyboard keys, touch pad surfaces/sensors, mouse wheels/balls/buttons, and so forth.

The illustrated connection management apparatus 32 includes a device locator 32a to identify a plurality of computing systems proximate to the peripheral device 30. Additionally, a gaze analyzer 32b (e.g., video processing unit/VPU with gaze analysis/recognition functionality) may determine a gaze location of a user based on, for example, one or more real-time video feeds received from cameras mounted to the computing systems. The video feeds may be received via a wired and/or wireless connection. The connection management apparatus 32 may also include a connection router 32c to automatically connect the peripheral device 30 to a first computing system in the plurality of computing systems based on the gaze location of the user.

In one example, the connection management apparatus 32 also includes a camera locator 32d to determine a camera identifier associated with the gaze location and a relationship analyzer 32e to detect a relationship between the first computing system and the camera identifier. The relationship analyzer 32e may therefore consult a relationship table such as, for example, Table I, in order to identify a physical coupling between the first computing system and the camera identifier.

Moreover, the gaze analyzer 32b may detect a change in the gaze location of the user and the connection router 32c may automatically connect the peripheral device 30 to a second computing system in the plurality of computing systems based on the change in the gaze location. As already noted, the gaze location may be determined based on a real-time video feed and/or depth information in the real-time video feed and the automatic connection may be made wirelessly. Accordingly, the connection router 32c may include wireless radio functionality such as, for example, Bluetooth and/or Wi-Fi functionality. The connection management apparatus 32 may alternatively be located elsewhere in the computing architecture such as in, for example, a wireless communications hub/access point, one or more of the computing systems, or other suitable network device.

Figure 4:
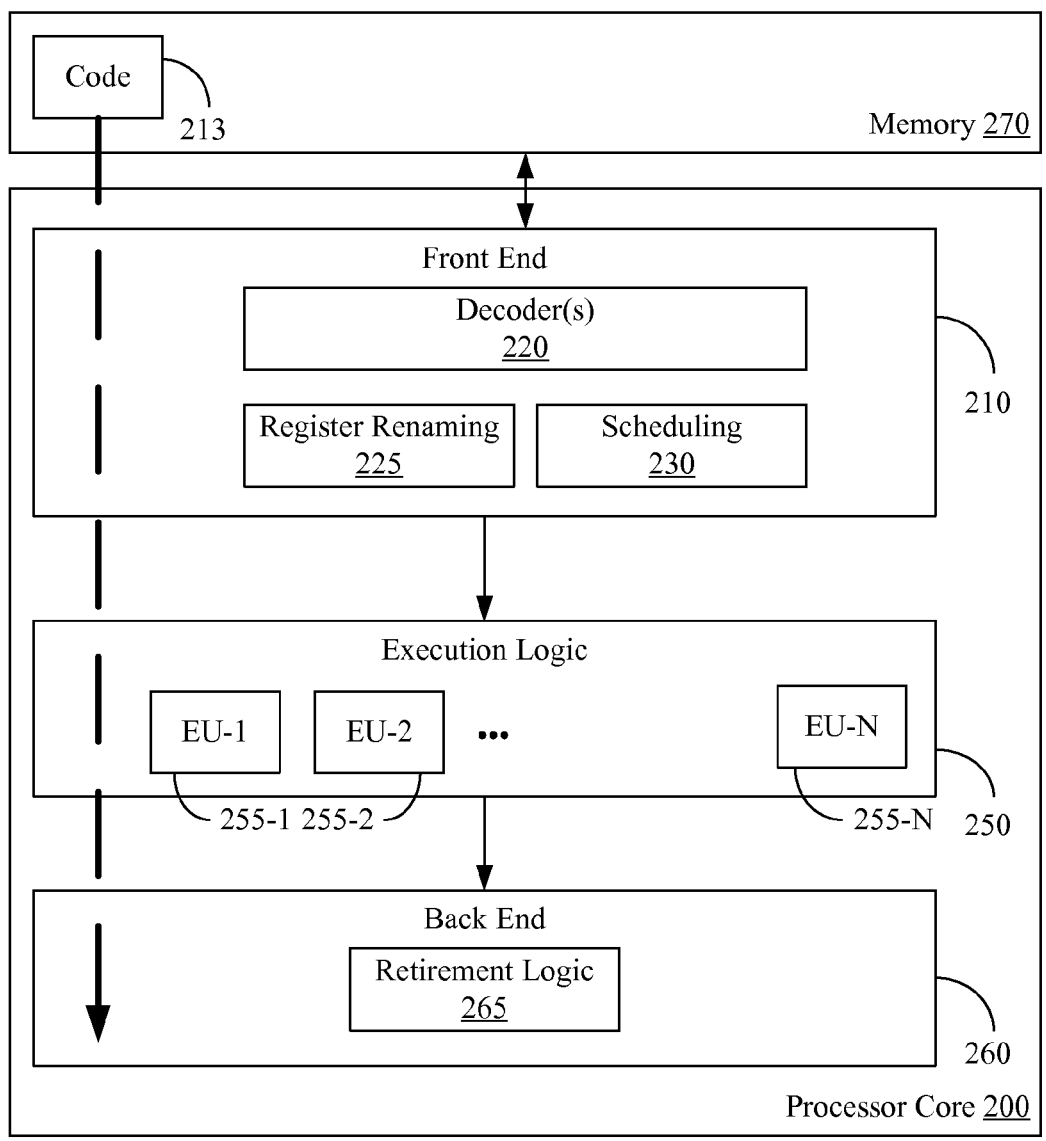
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 20 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
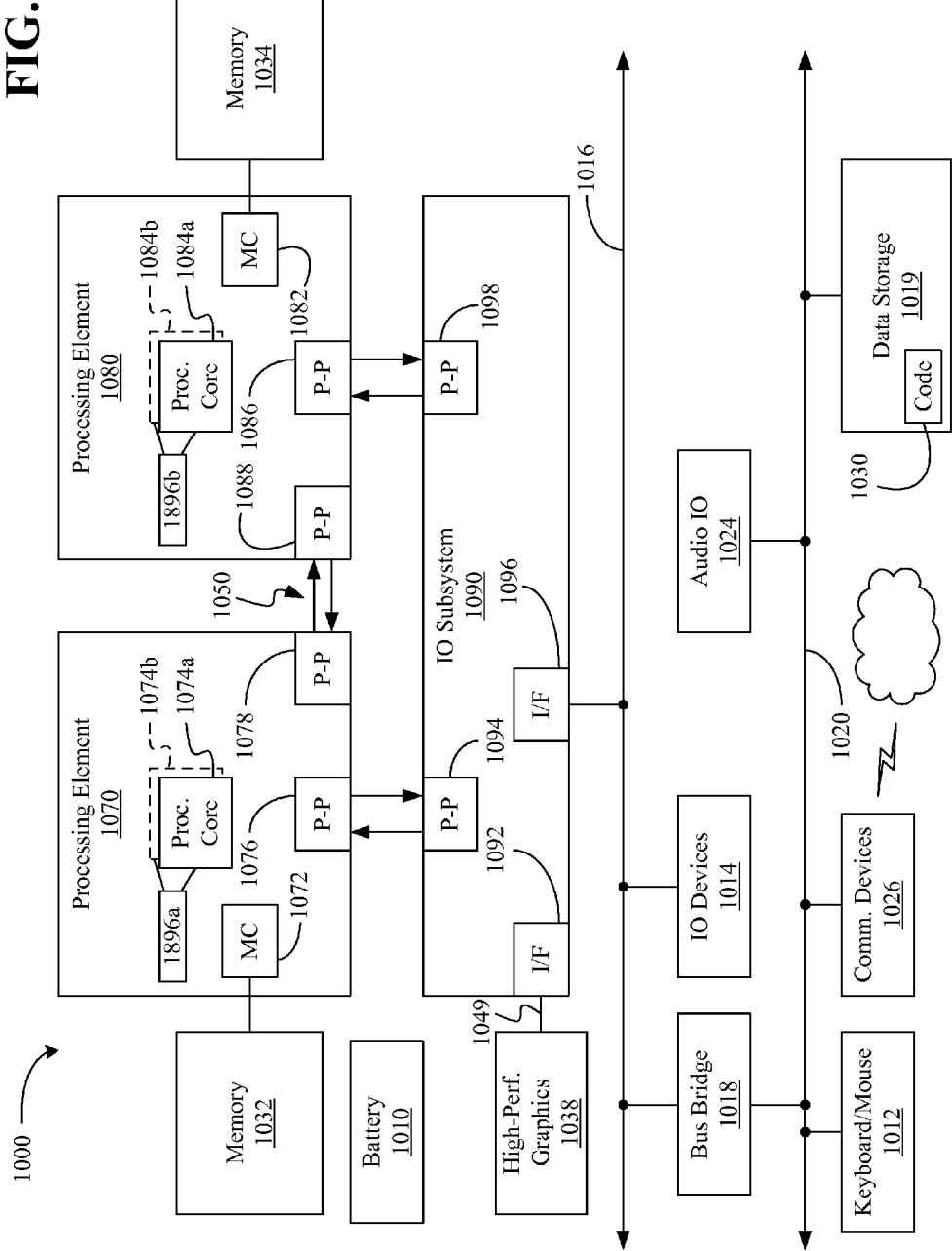
FIG. 5 is a block diagram of an example of a computing system according to an embodiment.

Referring now to FIG. 5, shown is a block diagram of a computing system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 4.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 20 (FIG. 2), already discussed, and may be similar to the code 213 (FIG. 4), already discussed. Additionally, the keyboard/mouse 1012 may execute the code 1030 in order to achieve functionality as described with respect to the peripheral device 30 (FIG. 3). Further, an audio I/O 1024 may be coupled to second bus 1020 and a battery 1010 may supply power to the computing system 1000.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

ADDITIONAL NOTES AND EXAMPLES

Example 1 may include a connection management apparatus comprising a device locator to identify a plurality of computing systems proximate to a peripheral device, a gaze analyzer to determine a gaze location of a user, and a connection router to automatically connect the peripheral device to a first computing system in the plurality of computing systems based on the gaze location of the user.

Example 2 may include the apparatus of Example 1, further including a camera locator to determine a camera identifier associated with the gaze location, and a relationship analyzer to detect a relationship between the first computing system and the camera identifier.

Example 3 may include the apparatus of Example 2, wherein the relationship is to be a physical coupling between the first computing system and a camera corresponding to the camera identifier.

Example 4 may include the apparatus of Example 1, wherein the gaze analyzer is to detect a change in the gaze location of the user and the connection router is to automatically connect the peripheral device to a second computing system in the plurality of computing systems based on the change in the gaze location.

Example 5 may include the apparatus of Example 1, wherein the gaze location is to be determined based on a real-time video feed.

Example 6 may include the apparatus of Example 5, wherein the gaze location is to be determined based on depth information in the real-time video feed.

Example 7 may include the apparatus of Example 1, wherein the peripheral device is to be automatically connected wirelessly with the first computing system.

Example 8 may include the apparatus of any one of Examples 1 to 7, wherein one of a keyboard, a touch pad, or a mouse is to be automatically connected to the first computing system.

Example 9 may include a method of operating a connection management apparatus, comprising identifying a plurality of computing systems proximate to a peripheral device, determining a gaze location of a user, and automatically connecting the peripheral device to a first computing system in the plurality of computing systems based on the gaze location of the user.

Example 10 may include the method of Example 9, further including determining a camera identifier associated with the gaze location, and detecting a relationship between the first computing system and the camera identifier.

Example 11 may include the method of Example 10, wherein the relationship is a physical coupling between the first computing system and a camera corresponding to the camera identifier.

Example 12 may include the method of Example 9, further including detecting a change in the gaze location of the user, and automatically connecting the peripheral device to a second computing system in the plurality of computing systems based on the change in the gaze location.

Example 13 may include the method of Example 9, wherein the gaze location is determined based on a real-time video feed.

Example 14 may include the method of Example 13, wherein the gaze location is determined based on depth information in the real-time video feed.

Example 15 may include the method of Example 9, wherein the peripheral device is automatically connected wirelessly with the first computing system.

Example 16 may include the method of any one of Examples 9 to 15, wherein one of a keyboard, a touch pad, or a mouse is automatically connected to the first computing system.

Example 17 may include at least one computer readable storage medium comprising a set of instructions, which when executed by a peripheral device, cause the peripheral device to identify a plurality of computing systems proximate to a peripheral device, determine a gaze location of a user and automatically connect the peripheral device to a first computing system in the plurality of computing systems based on the gaze location of the user.

Example 18 may include the at least one computer readable storage medium of Example 17, wherein the instructions, when executed, cause the peripheral device to determine a camera identifier associated with the gaze location, and detect a relationship between the first computing system and the camera identifier.

Example 19 may include the at least one computer readable storage medium of Example 18, wherein the relationship is to be a physical coupling between the first computing system and a camera corresponding to the camera identifier.

Example 20 may include the at least one computer readable storage medium of Example 17, wherein the instructions, when executed, cause the peripheral device to detect a change in the gaze location of the user, and automatically connect the peripheral device to a second computing system in the plurality of computing systems based on the change in the gaze location.

Example 21 may include the at least one computer readable storage medium of Example 17, wherein the gaze location is to be determined based on a real-time video feed.

Example 22 may include the at least one computer readable storage medium of Example 21, wherein the gaze location is to be determined based on depth information in the real-time video feed.

Example 23 may include the at least one computer readable storage medium of Example 17, wherein the peripheral device is to be automatically connected wirelessly with the first computing system.

Example 24 may include the at least one computer readable storage medium of any one of Examples 17 to 23, wherein one of a keyboard, a touch pad, or a mouse is to be automatically connected to the first computing system.

Example 25 may include a connection management apparatus comprising means for identifying a plurality of computing systems proximate to a peripheral device, means for determining a gaze location of a user, and means for automatically connecting the peripheral device to a first computing system in the plurality of computing systems based on the gaze location of the user.

Example 26 may include the apparatus of Example 25, further including means for determining a camera identifier associated with the gaze location, and means for detecting a relationship between the first computing system and the camera identifier.

Example 27 may include the apparatus of Example 26, wherein the relationship is to be a physical coupling between the first computing system and a camera corresponding to the camera identifier.

Example 28 may include the apparatus of Example 25, further including means for detecting a change in the gaze location of the user, and means for automatically connecting the peripheral device to a second computing system in the plurality of computing systems based on the change in the gaze location.

Example 29 may include the apparatus of Example 25, wherein the gaze location is to be determined based on a real-time video feed.

Example 30 may include the apparatus of Example 29, wherein the gaze location is to be determined based on depth information in the real-time video feed.

Example 31 may include the apparatus of Example 25, wherein the peripheral device is to be automatically connected wirelessly with the first computing system.

Example 32 may include the apparatus of any one of Examples 25 to 31, wherein one of a keyboard, a touch pad, or a mouse is to be automatically connected to the first computing system.

Thus, techniques described herein may track a user's eye movements to perform smooth handoff of peripheral devices among machines/computers. Such an approach may be particularly useful in perceptual computing and/or IoT technologies.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
    a device locator to identify a plurality of computing systems proximate to a peripheral device, wherein the plurality of computing systems are physically detached from each other, and wherein the peripheral device includes one or more of a keyboard, a touch pad, or a mouse;
    a gaze analyzer to:
        determine a first gaze location of a user; and
        detect a gaze change to a second gaze location of the user; and
    a connection router to:
        automatically establish a connection between the peripheral device and a first computing system in the plurality of computing systems that is not communicatively coupled with the peripheral device in response to the first gaze location of the user being on the first computing system to allow the user to enter input to the first computing system via the keyboard, the touch pad, or the mouse; and
        automatically establish a connection between the peripheral device and a second computing system in the plurality of computing systems that is not communicatively coupled with the peripheral device in response to the second gaze location being on the second computing system, wherein the connection between the peripheral device and the second computing system is to allow the peripheral device to communicate with the second computing system and not the first computing system to allow the user to enter input to the second computing system and not the first computing system via the keyboard, the touch pad, or the mouse.

2. The apparatus of claim 1, further including:
    a camera locator to determine a camera identifier associated with the first gaze location; and
    a relationship analyzer to detect a relationship between the first computing system and the camera identifier.

3. The apparatus of claim 2, wherein the relationship is to be a physical coupling between the first computing system and a camera corresponding to the camera identifier.

4. The apparatus of claim 1, wherein the first gaze location is to be determined based on a real-time video feed.

5. The apparatus of claim 4, wherein the first gaze location is to be determined based on depth information in the real-time video feed.

6. The apparatus of claim 1, wherein the peripheral device is to be automatically connected wirelessly with the first computing system.

7. A method comprising:
identifying a plurality of computing systems proximate to a peripheral device, wherein the plurality of computing systems are physically detached from each other, and wherein the peripheral device includes one or more of a keyboard, a touch pad, or a mouse;
determining a first gaze location of a user;
automatically establishing a connection between the peripheral device and a first computing system in the plurality of computing systems that is not communicatively coupled with the peripheral device in response to the first gaze location of the user being on the first computing system to allow the user to enter input to the first computing system via the keyboard, the touch pad, or the mouse
detecting a gaze change to a second gaze location of the user; and
automatically establishing a connection between the peripheral device and a second computing system in the plurality of computing systems that is not communicatively coupled with the peripheral device in response to the gaze change being on the second computing system, wherein the connection between the peripheral device and the second computing system is to allow the peripheral device to communicate with the second computing system and not the first computing system to allow the user to enter input to the second computing system and not the first computing system via the keyboard, the touch pad, or the mouse.

8. The method of claim 7, further including:
determining a camera identifier associated with the first gaze location; and
detecting a relationship between the first computing system and the camera identifier.

9. The method of claim 8, wherein the relationship is a physical coupling between the first computing system and a camera corresponding to the camera identifier.

10. The method of claim 7, wherein the first gaze location is determined based on a real-time video feed.

11. The method of claim 10, wherein the gaze location is determined based on depth information in the real-time video feed.

12. The method of claim 7, wherein the peripheral device is automatically connected wirelessly with the first computing system.

13. At least one non-transitory computer readable storage medium comprising a set of instructions, which when executed by a peripheral device, cause the peripheral device to:

identify a plurality of computing systems proximate to a peripheral device, wherein the plurality of computing systems are physically detached from each other, and wherein the peripheral device includes one or more of a keyboard, a touch pad, or a mouse;
determine a first gaze location of a user;
automatically establish a connection between the peripheral device and a first computing system in the plurality of computing systems that is not communicatively coupled with the peripheral device in response to the first gaze location of the user being on the first computing system to allow the user to enter input to the first computing system via the keyboard, the touch pad, or the mouse;
detect a gaze change to a second gaze location of the user; and
automatically establish a connection between the peripheral device and a second computing system in the plurality of computing systems that is not communicatively coupled with the peripheral device in response to the gaze change being on the second computing system, wherein the connection between the peripheral device and the second computing system is to allow the peripheral device to communicate with the second computing system and not the first computing system to allow the user to enter input to the second computing system and not the first computing system via the keyboard, the touch pad, or the mouse.

14. The at least one computer readable storage medium of claim 13, wherein the instructions, when executed, cause the peripheral device to:
determine a camera identifier associated with the first gaze location; and
detect a relationship between the first computing system and the camera identifier.

15. The at least one computer readable storage medium of claim 14, wherein the relationship is to be a physical coupling between the first computing system and a camera corresponding to the camera identifier.

16. The at least one computer readable storage medium of claim 13, wherein the first gaze location is to be determined based on a real-time video feed.

17. The at least one computer readable storage medium of claim 16, wherein the first gaze location is to be determined based on depth information in the real-time video feed.

18. The at least one computer readable storage medium of claim 13, wherein the peripheral device is to be automatically connected wirelessly with the first computing system.

* * * * *